(12) United States Patent
Djuve et al.

(10) Patent No.: US 7,514,898 B2
(45) Date of Patent: Apr. 7, 2009

(54) LOW LOSS PROPULSION SYSTEM

(75) Inventors: Svein Magne Djuve, Stord (NO); Egil Hystad, Stord (NO)

(73) Assignee: Wartsila Norway AS (NO)

( * ) Notice: Subject to any disclaimer, the term of this patent is extended or adjusted under 35 U.S.C. 154(b) by 48 days.

(21) Appl. No.: 11/570,015

(22) PCT Filed: Jun. 6, 2005

(86) PCT No.: PCT/NO2005/000192

§ 371 (c)(1),
(2), (4) Date: Dec. 4, 2006

(87) PCT Pub. No.: WO2005/119892

PCT Pub. Date: Dec. 15, 2005

(65) Prior Publication Data

US 2007/0247878 A1 Oct. 25, 2007

(30) Foreign Application Priority Data

Jun. 4, 2004 (NO) .................................. 20042311

(51) Int. Cl.
*H02P 1/26* (2006.01)
(52) U.S. Cl. .................. 318/771; 318/727; 318/106
(58) Field of Classification Search ............... 318/771, 318/727, 106; 363/5, 64
See application file for complete search history.

(56) References Cited

U.S. PATENT DOCUMENTS

| | | | |
|---|---|---|---|
| 4,498,127 A | 2/1985 | Fiorina | |
| 4,816,980 A | 3/1989 | Wiendl | |
| 5,446,643 A | 8/1995 | McMurray | |
| 2005/0134386 A1* | 6/2005 | Westwick et al. | 330/301 |

FOREIGN PATENT DOCUMENTS

| | | |
|---|---|---|
| DE | 4232356 A1 | 3/1994 |
| EP | 0472928 A1 | 4/1992 |
| EP | 0584660 A2 | 3/1994 |
| EP | 0584660 A3 | 3/1994 |
| GB | 506280 A1 | 5/1939 |

OTHER PUBLICATIONS

PCT/NO2005/000192, International Search Report, Nov. 10, 2005, 4 pages.
Norwegian Patent Application No. 2004 2311, Search Report from the Norwegian Patent Office No. 1, Dec. 20, 2004, 1 page.
Norwegian Patent Application No. 2004 2311, Search Report from the Norwegian Patent Office No. 2, Sep. 6, 2005, 1 page.
PCT/NO2005/000192 International Report on Patentability, Jul. 28, 2006, 6 pages.

* cited by examiner

*Primary Examiner*—Karen Masih
(74) *Attorney, Agent, or Firm*—Lewis and Roca LLP

(57) ABSTRACT

This invention relates to low loss power supply system comprising a rectifying bridge (3) supplying current to a motor, wherein the rectifying bridge including two AC power feed inputs PA, PB as well as at least one output for supplying power to said motor M, and wherein an YD transformer (2) is coupled between said inputs, said YD transformer, comprising a star and delta winding, and being adapted to provide an approximately 30° phase shift relative to the chosen fundamental frequency between said inputs.

3 Claims, 2 Drawing Sheets

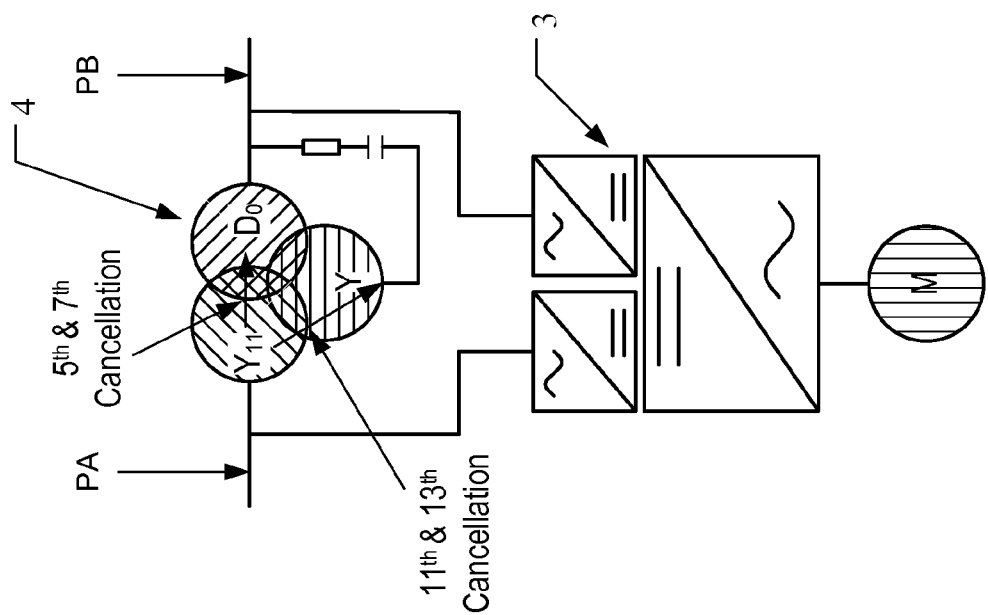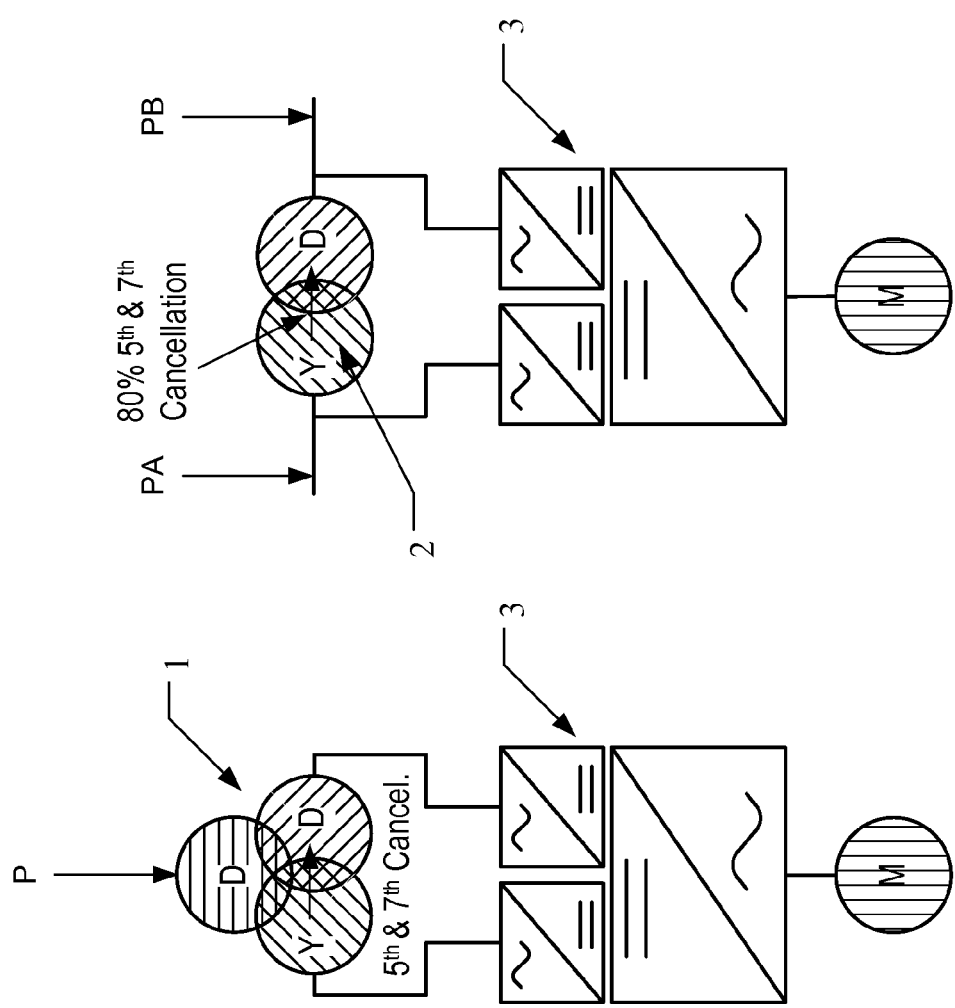

LOW LOSS PROPULSION SYSTEM

CROSS-REFERENCE TO RELATED APPLICATIONS

This application claims priority to PCT Patent Application Serial Number PCT/NO2005/000192, filed Jun. 6, 2005, which claims priority to Norwegian Patent Application Serial Number 2004 2311, filed Jun. 4, 2004, which are hereby incorporated by reference as if set forth herein.

This invention relates to a low loss propulsion system comprising a rectifying bridge and inverter supplying current to a motor, the rectifying bridge including two AC power feed inputs as well as at least one output for supplying power to said motor.

In supplying power to electric motors, e.g. in diesel electric propulsion systems or pipe heating systems in offshore installations, it is usual to use a rectifying bridge coupling coupled to a three phase power supply through a transformer, said transformer providing two AC supplies to the inputs of the rectifying bridge. This solution does, however have a problem related to the generation of noise comprising over harmonic voltages which combined with the full load current through the transformer windings, represents a strain factor on the existing circuitry in the rectifying bridge, the remaining network and an increased power loss through the transformer. The problem is especially related to the 5th and 7th over harmonic.

In order to cancel out the 5th and 7th over harmonic currents the output of the transformers have been adapted to provide signals to the rectifying bridge having a phase shift of about 30°s. It is an object of this invention to provide an improvement over this system. Through a special design of the low loss transformer, combined with a small filter, the transformer losses will be greatly reduced, and the total harmonic distortion on the total power system will decrease. U.S. Pat. No. 5,446,643 shows an example of filtering of 5 and 7 harmonic currents through a transformer coupling.

A solution is described in U.S. Pat. No. 4,498,127 transformer coupling being coupled to a frequency transformer. This patent relates to a variant of a 12 pulse power supply transformer, dedicated to a converter in which the power is transferred through the rectifier bridge. Thus, if this system is provided with a symmetric power supply the first harmonics of the power is feed to through the transformer before the rectifiers. It is an object of this invention to feed the first harmonic power directly to the frequency transformers from the power source. It is also an object to provide reduced short circuit current in a system using a transformer in an electrical distribution net.

The objects of this invention is obtained as described in the accompanying claims.

The invention thus relates to a propulsion system wherein an transformer is coupled between said inputs, said transformer, comprising (but not limited to) a star and delta winding, and being adapted to provide an approximately 30° phase shift relative to the chosen fundamental frequency between said inputs. This way the 5th and 7th harmonics are cancelled or at least suppressed a considerable degree. According to a preferred embodiment the power feeds at the transformer inputs are symmetric, so that no current at the fundamental frequency, passes through the transformer. The transformer thus acts a filter for over harmonics.

Further, according to another embodiment of the invention the system transformer also comprises a second star winding at a 150° angle from the first star winding so as to suppress 11th and 13th harmonics of the signal.

The invention thus provides a system which allows for increased us of low voltage equipment by reducing the short circuit level in the net.

The invention will be described below with reference to the accompanying drawings, illustrating the invention by way of examples.

FIG. 1 illustrates the known art.

FIG. 2 illustrates the invention

FIG. 3 illustrates a preferred embodiment of the invention

FIG. 1 illustrates a generator or power feed P coupled to a transformer 1 for providing two inputs to a rectifying bridge 3, e.g. for providing power to a motor M. As stated above this solution is sensitive to loss over the transformer as well as to over harmonics.

Figure 4:
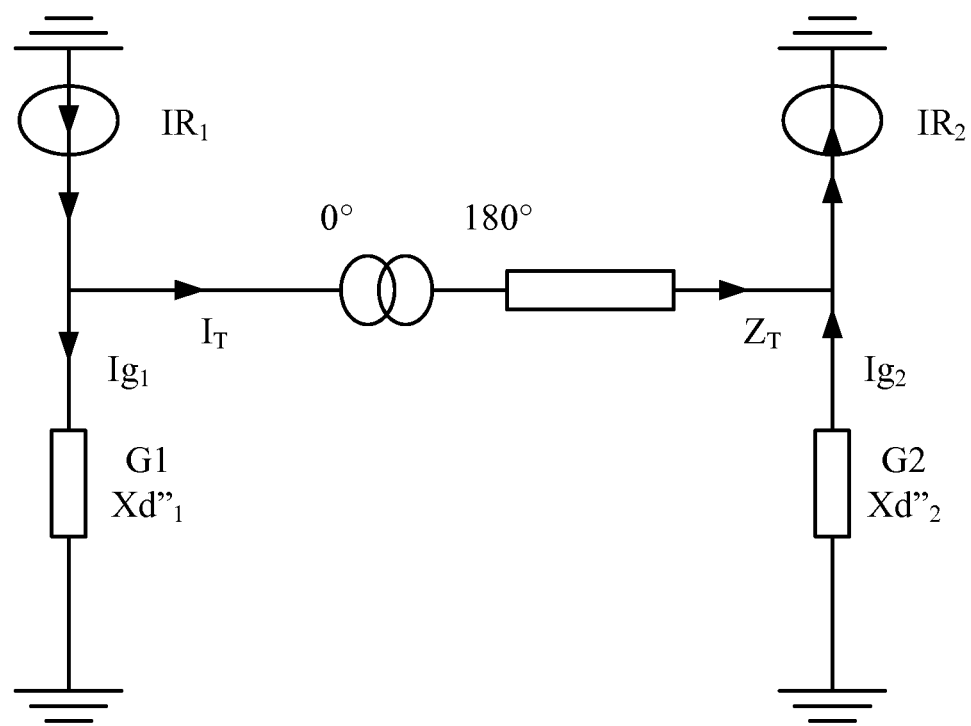
FIG. 4 illustrates an equivalent circuit corresponding to the invention.

As is illustrated in FIG. 2 the present invention relates to a solution in which AC power feeds PA, PB are supplied to the two inputs of the rectifying bridge. A transformer device is provided between these inputs having a Star/Delta (YD) winding structure, preferably a $D_0 Y_{11}$ structure, providing a 30° phase shift. This coupling is per known art and will not be describes here.

A specific transformer winding connection according to the IEC vector group $D_0 Y_{11}$ will always have a 30° phase shift between the two windings, as is documented in IEC norm IEC 76. This 30° phase shift is related to the fundamental frequency, normally 50 or 60 Hz. A 6 pulse rectifier connected to a 3-phase voltage source will introduce harmonic currents into the system when loaded. The harmonic current in this distortion will be $I_{thd}=6n\pm 1$ (n=1,2,3 ... ).

These harmonic current components will have an additional phase shift, which can be calculated as the fundamental phase shift multiplied by the harmonic order. In addition the phase angle of the $5^{th}$ and $7^{th}$ harmonics will "rotate" in the opposite directions.

It is a well known fact that the $5^{th}$ and $7^{th}$ harmonic components will have a total phase shift of 180° through the transformer. This is shown in the following equations:

$$\phi 5^{th}=\phi_1+5\cdot\phi,=30°+5\cdot 30°=180°$$

$$\phi 7^{th}=\phi_1-7\cdot\phi,=30°-7\cdot 30°=-180$$

Using these conclusions the equivalent circuit illustrated in FIG. 4 can be developed for the system analyses of the present invention. In FIG. 4 the xd" and xd" the following definition will apply:

$IR_1=5^{th}$ or $7^{th}$ harmonic current from rectifier no. 1

$IR_2=5^{th}$ or $7^{th}$ harmonic current from rectifier no. 2

$Z_T$=short circuit impedance in the LLC transformer related to the $5^{th}$ and $7^{th}$ harmonic.

$Xd"_1$=the subtransient reactance in generator 1 related to the $5^{th}$ and $7^{th}$ harmonic current.

$Xd"_2$=the subtransient reactance in generator 2 related to the $5^{th}$ and $7^{th}$ harmonic current.

$I_T$=Harmonic current in LLC transformer $Ig_1$ and $Ig_2$=Harmonic current in generator.

Using Kirchoffs law on the current loop in the equivalent diagram, the following equations will apply:

$$IR_1=I_T+Ig_1 \qquad 1)$$

$$IR_2=I_T+Ig_2 \qquad 2)$$

$$Xd"_1\cdot Ig_1-Z_T I_T+Xd"_2\cdot Ig_2=0 \qquad 3)$$

Solving these equations will give the following result:

$$I_T = \frac{Xd_1'' \cdot IR_1 + Xd_2'' \cdot IR_2}{Xd_1'' + Xd_2'' + Z_T} \quad 4)$$

For a symmetrical system in which PA and PB in FIGS. 2 and 3 are symmetric $Xd''_1=Xd''_2$ and $IR_1=IR_2$ the equations may be simplified as follows:

$$I_T = \frac{2Xd_1'' \cdot IR}{2Xd'' + Z_T} \quad 5)$$

$$Ig_1 = Ig_2 = Ig = I_R - I_T = I_R\left(1 - \frac{2Xd''}{2Xd'' + Z_T}\right) \quad 6)$$

The voltage distortion $U_{thd}$ from each individual component measured at the generator terminals, will be the harmonic current introduced in the generator multiplied with the subtransient reactance $$U_{thd} = Ig \cdot Xd'' = I_R \cdot Xd''\left(1 - \frac{2Xd''}{2Xd'' + Z_T}\right) \quad 7)$$

Thus, as the inputs to the rectifying bridge are parallel no large amounts of power will be transferred across the transformer, but the 30° phase shift will filter out and thus suppress the 5th and 7th harmonics of the applied power signal.

The embodiment of the invention as illustrated in FIG. 2 thus provides a solution with an approximately −75-85% reduction of the 5th & 7th harmonic currents through the generator. According to the preferred embodiment of the invention the power feed is symmetric power, so that no current of the fundamental frequency (60 HZ) will flow through the LLC transformer, and, as only losses caused by harmonic currents remain, they are reduced to 10-20% of nominal losses.

Also, voltage distortion from 5th and 7th. harmonic reduced to less then 3%. If one of the power feeds are lost, approx. 50% of the load will flow through the LLC transformer. At asymmetric feed, only a small increase in THD will be observed.

FIG. 3 illustrates a preferred embodiment of the invention in which a third winding is introduced to the system for suppressing the 11th and 13th harmonics. The transformer thus providing a $D_0/Y_{11}/Y_5$ vector group and a phase shift of 150° or 180° for the third winding in relation to the main windings. The theory for this is essentially the same as above and will not be elaborated here.

The embodiments of the invention described above are based on a system using 60 Hz, 690V power feeds. The adaptation of these parameters in practical use is considered to be obvious to a person skilled in the art, and will not be described in any detail here.

The invention claimed is:

1. Low loss propulsion power supply system comprising a rectifying bridge supplying current to a motor, wherein the rectifying bridge including two AC power feed inputs as well as at least one output for supplying power to said motor, and wherein an YD transformer is coupled between said inputs, said YD transformer, comprising a star and delta winding, and being adapted to provide an approximately 30° phase shift relative to the chosen fundamental frequency between said inputs, and wherein the transformer also includes a second star winding at a 150° angle from the first star winding.

2. Power supply system according to claims 1, wherein said AC power feeds are symmetric.

3. Power supply system according to claims 1, wherein said YD transformer constitutes a $D_0/Y_{11}$ vector group, the windings as a whole thus constituting a $D_0/Y_{11}/Y_5$ vector group.

* * * * *